May 1, 1956  W. FEW ET AL  2,744,230
AUTOMATIC CURRENT REGULATING APPARATUS
Filed July 28, 1952  3 Sheets-Sheet 1
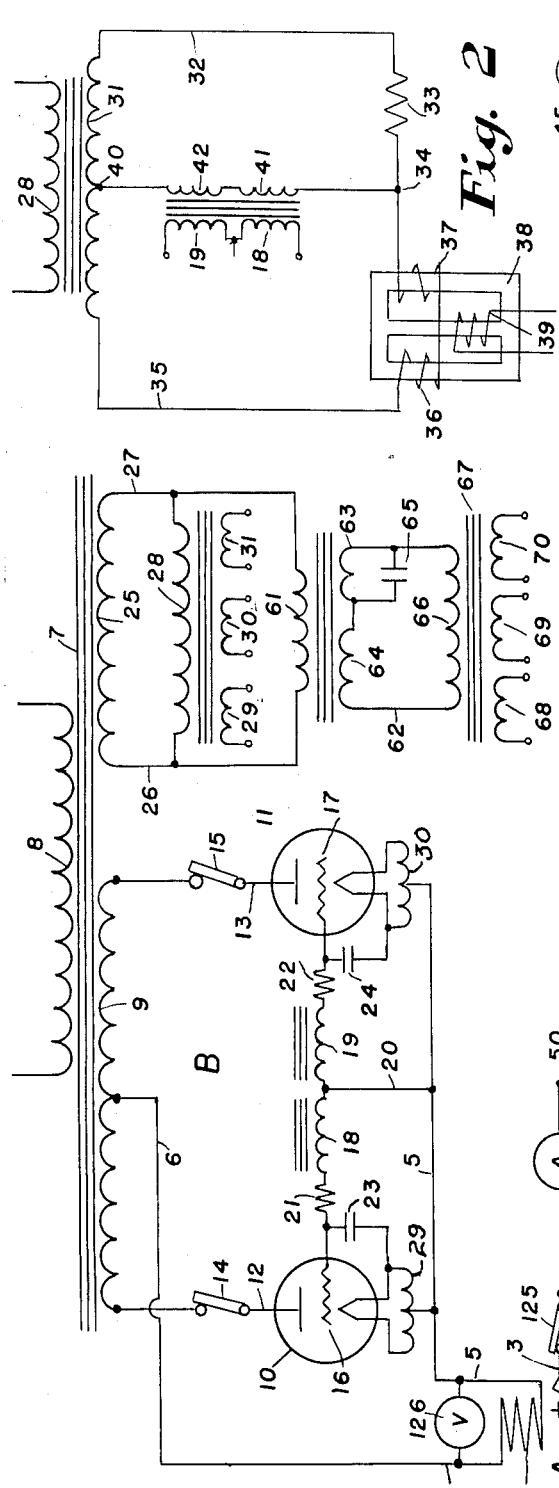
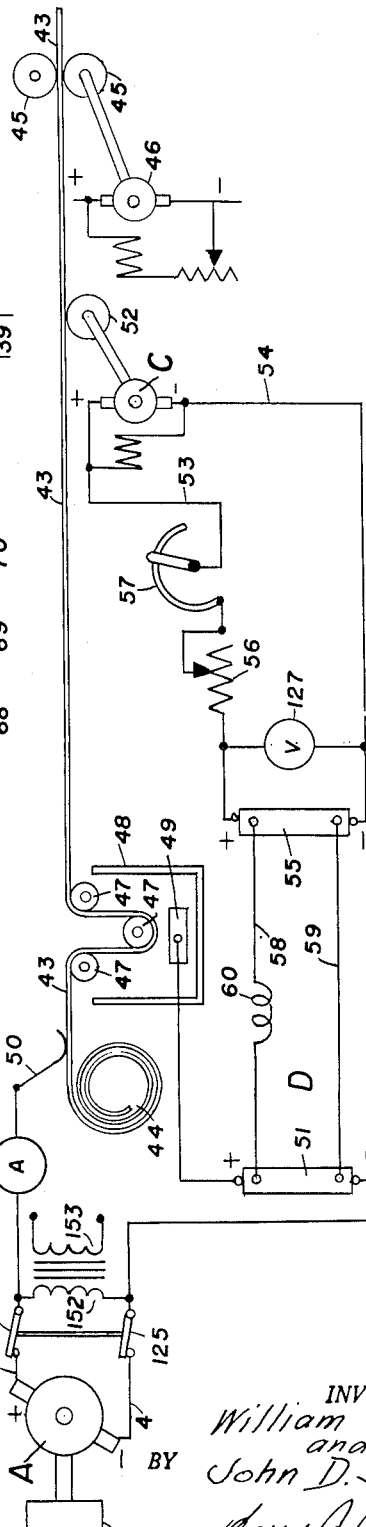
Fig. 2
Fig. 1
INVENTOR.
William Few
and
John D. Sauter
BY
Harry P. Canfield
Attorney May 1, 1956 W. FEW ET AL 2,744,230
AUTOMATIC CURRENT REGULATING APPARATUS
Filed July 28, 1952 3 Sheets-Sheet 2

INVENTOR.
William Few
and
John D. Sauter
BY
Harry P. Canfield
Attorney

May 1, 1956 W. FEW ET AL 2,744,230
AUTOMATIC CURRENT REGULATING APPARATUS
Filed July 28, 1952 3 Sheets-Sheet 3

INVENTOR.
William Few
and
BY John D. Sauter
Harry P. Canfield

United States Patent Office 2,744,230
Patented May 1, 1956

2,744,230

AUTOMATIC CURRENT REGULATING APPARATUS

William Few, Cleveland Heights, and John D. Sauter, Lyndhurst, Ohio, assignors to The Clark Controller Company, Cleveland, Ohio, a corporation of Ohio Application July 28, 1952, Serial No. 301,292

9 Claims. (Cl. 322—27)

This invention relates to electric systems of control and regulation by which a preselected ratio between the amperage of an electric current and some other factor, such as temperature, speed, etc. is maintained at an adjustable constant value.

More particularly the invention relates to means and methods for effecting such constant ratio control and regulation in cases in which the said other factor is constant, and the said ratio is maintained constant by regulating the current to a corresponding constant value; or cases in which said other factor varies, and the ratio is maintained constant by correspondingly varying the current.

The invention is applicable to various arts; but in order to present herein a concrete embodiment of the invention, as required by law, it has been chosen to illustrate and describe it as applied to the control and regulation of so-called electrolytic anodic current, and it will become apparent hereinafter that it may also be applied to the control and regulation of electrolytic plating current.

The actual invention is that set forth in the appended claims; but the embodiment of the invention herein comprises, generally speaking, an electrolytic bath or cell, through which a strip of metal to be chemically treated by anodic current is drawn or propelled by power at a selected speed.

A direct current generator, driven by a convenient source of power, supplies the current.

The field of the generator is energized by direct current rectified by electronic rectifier tubes, from alternating current supply mains; and the field current (and therefore the current output of the generator) is controlled and regulated by a phase-shift system for the tube grids, to maintain a preselected ratio between generator current and strip speed.

The phase-shift system is of the saturable reactor type comprising a direct current saturating winding; and the saturating current in the winding is in the main electrode circuit of an electronic control tube, and the amount of the saturating current is controlled and regulated by variable energization of the control tube grid.

The main electrodes of the control tube and the saturating winding are in a circuit across unidirectional control mains supplied with unidirectional potential from alternating current mains through a rectifier.

A network is provided comprising a saturable reactor of the transductor class, and of novel construction and arrangement of parts and circuits, energized by alternating current input, and supplying unidirectional output potential between a pair of grid mains one of which is connected to the grid of the control tube; and the network comprises adjustment means for the transductor and its output, by which the potential on the said grid mains is determined.

A closed loop circuit is provided having opposing potentials impressed thereon proportional to the generator current and to the speed of the strip; and the loop contains a transductor control winding.

In the preferred mode of operation, when the said predetermined ratio obtains, and the system as a whole is in so-called balanced condition, the loop circuit is in a corresponding balanced condition at which no current flows in the control winding; but current flows in one direction or the other if a deviation from said ratio occurs.

In another mode of operation when the loop circuit is in balanced condition, and the predetermined ratio obtains, current of a certain value always flows in the control winding in one direction, and increases or decreases from that value upon deviation of the ratio.

The transductor control winding when thus variably energized influences the transductor to correspondingly cause the potential on the control tube grid mains to change, and change the current therethrough to cause the phase-shift saturating winding to effect a change of generator output, to restore the balanced condition in the closed loop circuit, and thereby restore the said ratio.

The illustrated embodiment also comprises a novel improved filter circuit for the current to the control tube grid; and comprises anti-hunting controls for the generator; and other supplemental features which will be described hereinafter.

The objects of the invention are, to provide:

An improved regulating and control system having the mode of operation described above;

A transductor having an improved arrangement of parts and circuits for the purposes thereof described above;

A filtering circuit adapted for association with a pair of mains and operating in an improved manner;

An improved regulating and control system in which variations of current amperage in a main circuit, vary the current in a control winding; and the variations of control winding current actuate a transductor to cause it to supply varying unidirectional potenial across a pair of control mains; and the amperage in the main circuit is regulated and controlled responsive to variations of control main potential in an improved manner.

An improved regulating and control system in which two opposing potentials are impressed upon a control winding, one proportional to the amperage in a main circuit; and the zero current, or the current in one direction or the other in the control winding, resulting from equality of the opposing potentials or a difference thereof, actuates a transductor to cause it to supply constant potential to one control main and to supply potential to another control main that varies as the current in the control winding varies; and the main circuit is supplied with current of value varying with variations of potential across the control mains; whereby a predetermined ratio between the two opposing potentials is maintained.

An improved regulating and control system as referred to in the preceding paragraph and in which the two opposing potentials are derived from the current outputs of two generators, and the predetermined ratio is that between the generator outputs.

The invention, in the chosen embodiment thereof, is fully disclosed in the following description, to be read in connection with the accompanying drawing, in which:

Fig. 1 is a diagrammatic illustration of a part of an embodiment of the invention, showing a main generator supplying main current to an electrolytic cell, and a generator driven by a strip of material drawn through the cell, and a tube rectifier supplying current to the field of the main generator; and showing the output portion of a phase shift system for the rectifier; and showing a control winding in a balancing loop circuit;

Fig. 2 is a diagrammatic view showing the input portion of the phase shift system of Fig. 1 and showing a saturating winding as a part thereof;

Figure 3:
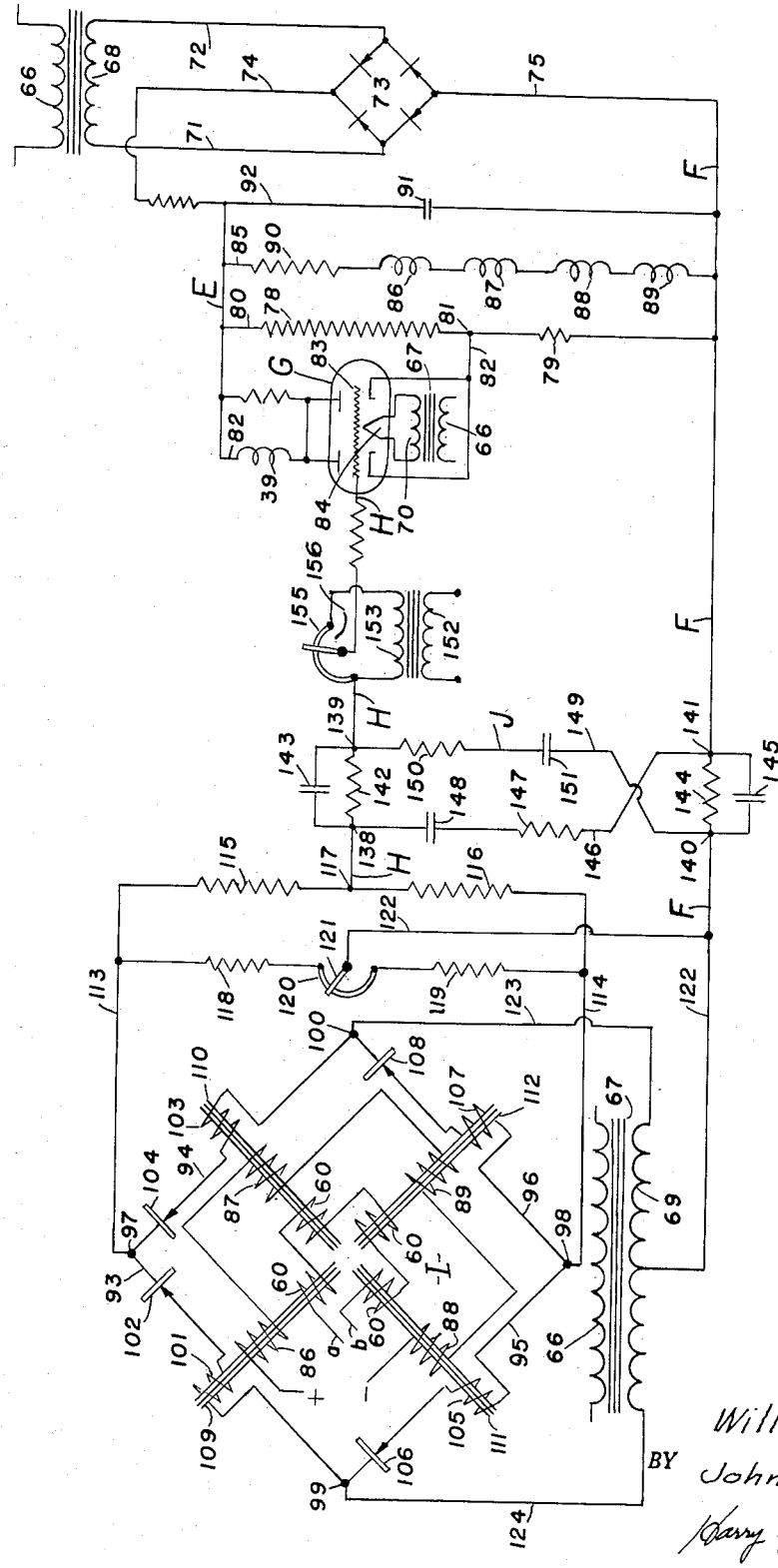
Fig. 3 is a diagrammatic illustration of another part of the embodiment of the invention, showing a transductor for energizing control mains controlling the energization of the phase shift saturating winding of Fig. 2, and showing the control winding of Fig. 1 associated with the transductor; and showing a filtering circuit for the control mains.

Referring to the drawing, it will be noted that, as described below in detail, certain transformer secondaries are shown associated with their primaries but without circuits connected thereto, and are reproduced elsewhere with their circuit connections; and similarly certain inductor windings are shown without circuit connections thereto but reproduced elsewhere with their circuit connections; this type of illustration being adopted to avoid complexity of circuit connections difficult to follow.

In Fig. 1 of the drawing is a direct current generator A, driven by any suitable power source 1, and having a field winding 2 (hereinafter referred to as the "field") and having positive and negative current output mains 3 and 4.

The field 2 is energized from output mains 5–6 of a two-tube full wave rectifier B. It is of well known type and therefore can be briefly described as comprising: a transformer 7 having a primary 8 and a secondary 9; a wire 6 connected to a mid-point of the secondary and constituting the said output main 6; rectifier tubes 10–11 having their anodes connected by wires 12–13 to the opposite ends of the secondary 9 through contactors 14–15; and having their cathodes connected to a common wire 5 constituting part of the said output main 5.

The grids 16–17 of the tubes are energized by transformer secondaries 18–19, connected at a midpoint therebetween by wire 20 to the cathode wire 5, and connected at the outer ends to the grids. Resistors 21–22 in series with the grids, and capacitors 23–24 bridging the cathodes and grids, are provided for the usual purposes.

The main transformer 7 has also a secondary 25 energizing auxiliary mains 26–27 for various uses, one of which is to energize a transformer primary 28 having secondaries 29, 30 and 31 shown without circuits.

Of this group, the secondaries 29 and 30 are shown at the tubes 16–17 connected to the cathodes of the tubes to heat the same.

The secondary 31 is shown in Fig. 2 as energizing the following phase shift system for the tubes 10.11.

One end of the secondary 31 is connected by a wire 32 through a resistor 33 to a point 34. The other end of the secondary 31 is connected by a wire 35 through two reactor windings 36–37 to the point 34, the reactor windings being on two legs of a three leg saturable reactor core 38. A direct current saturating winding 39 to be described is on the middle leg.

The point 34 is connected to the midpoint 40 of the secondary 31 through two transformer primaries 41–42, having the aforesaid secondaries 18–19 (here shown without circuit connections) reproduced in Fig. 1 in the respective tube grid circuits.

By well known action, increases of current in the saturating winding 39, changing the inductance of the windings 36–37 will shift the phase of the potential between the points 34—40 and by means of the secondaries 18–19 shift the phase of the tube grids 16–17; an increase of current in the winding 39 causing the tubes 10–11 to pass more current and vice versa.

A strip of metal 43 to be chemically treated by anodic current is shown wound on a supply drum 44; drawn therefrom by rolls 45 driven by an electric motor 46, preferably a D. C. motor whose speed can be adjusted, as shown; and between the drum and driving motor the strip passes over three rolls 47 causing the strip to dip into electrolyte of a cell 48, having in the electrolyte an electrode 49.

The positive output main 3 of the generator A makes brush contact with the strip 43 at 50. The negative output main 4 connects with the electrode 49.

In the line of the main 4 is a low resistance unit 51.

A direct current generator C of the tachometer type is driven by the strip 43 at strip speed by a roller 52 contacting the strip.

In the output circuit mains 53–54 of the generator C is a low resistance unit 55; and to adjust the current flow therein is a main adjustable rheostat 56 and a micrometer rheostat 57.

Wires 58–59 connect end portions of the resistance units 51—55, and therewith constitute a closed balancing loop D; and in the line of the wire 58 is a control winding 60.

For purposes to be more fully described, the current of the generator A in the resistance unit 51 produces a small drop of potential in the loop D say in the clockwise direction; and the current of generator C in the unit 55 produces a drop of potential in the counterclockwise direction and the two potentials oppose each other in the loop D.

The aforesaid preselected ratio to be maintained by the system as a whole is that between the current of generator A, and the speed of strip 43 (or, its equivalent, the current of generator C); and when the ratio is established and the system is operating normally it may be referred to as in balanced condition.

In the preferred mode of operation, the two potentials impressed on the loop D are adjusted to be equal when the system is in balance, at the said ratio, and then no current flows in the winding 60.

Any deviation from the predetermined ratio causes current to flow in the winding 60 in one direction or the other; and it then functions in a manner to be described to change the current of generator A to restore the ratio and balance.

The means for energizing the saturating winding 39 of the above described phase shift system of Fig. 2 will now be described.

The aforesaid auxiliary mains 26–27 of Fig. 1 energize a transformer primary 61, having a closed loop circuit 62 containing a two coil secondary at 63–64 and a capacitor 65 and the transformer primary 66 of a transformer 67 which energizes three secondaries, 68, 69 and 70, (shown without circuit connections).

This loop circuit 62 is of a well known type; and is not a part of the present invention; and need not be fully described. Its function in operation is to automatically regulate to a constant value the output potentials of the secondaries 68, 69 and 70.

The secondary 68, reproduced in Fig. 3 with its circuit connections, supplies alternating current by wires 71–72 to a polygonal loop rectifier 73, which delivers direct current by wires 74–75 to two control mains E and F poled to be positive and negative respectively. The potential across the mains E—F is maintained constant through the agency of the said loop circuit 62 as will be understood; and a suitable value in an illustrative case may be 120 volts. A pair of resistors 78–79 are in a line 80 between the control mains, constituting in effect a voltage divider and providing a point 81 of slightly higher potential than the main F; determined by a large value of the resistor 78 relative to a small value of the resistor 79, which may be in the ratio, respectively, of 80 to 1, whereby the voltage at the point 81 may in the illustrative case be 1.5 volts.

A three element control tube G has its main electrodes in a line 82—82 between the control main E and the point 81, and the aforesaid saturating winding 39 is in the line 82.

The tube G has a heater 84 energized by the said secondary 70 of the transformer 67.

The value of current in the winding 39 is, at all times, determined by the energization of the grid 83 of the tube G in a manner to be described.

In a line 85 across the control mains E—F is a series of four flux biasing windings 86, 87, 88 and 89 to be referred to, all alike and equally energized at a constant value by the constant voltage of the mains E—F, the degree of energization determined by a resistor 90 in the line.

A filtering capacitor 91 is provided in a line 92 across the mains E—F for the usual purposes.

As to energization of the grid 83 of tube G, the grid is connected to a line indicated generally at H—H—H, and the cathode of the tube is connected to the point 81, and thence to the main F, and energization of the grid will therefore vary responsive to variations of the potential across the mains H—F, but since the point 81 is at a potential higher than the main F (by 1.5 volts in the aforesaid illustrative case) the potential energizing the grid may be considered as the preponderance of the sum of the potentials of the main H and of the point 81 over the potential of main F.

In a manner now to be described, the potential between mains H and F has a value at which the system is in balance at the said preselected ratio, and the said potential is changed, when it gets out of balance, to change the energization of the grid 83; and as a part of the invention, does so exceedingly sensitively and substantially rectilinearly, in response to changes of energization of the control winding 60 in the balancing loop D, to thereby restore the said balance and ratio. The relative potential of mains H and F is changed, as referred to, by raising or lowering the potential of main F with respect to that of main H. The potential of main F may be made equal to or even somewhat greater than that of main H, but because of the potential at the point 81 as described, the grid remains positive.

At I in Fig. 3 is a diagrammatic showing of a saturable reactor of the transductor class, comprising a rectangular loop circuit having four legs 93—94—95 and 96, and rectangular corners 97, 98, 99 and 100.

In each leg is an inductor winding and a dry plate rectifier, that is: in the leg 93, a winding 101 and rectifier 102; in the leg 94, a winding 103 and rectifier 104; in the leg 95, a winding 105 and rectifier 106; and in the leg 96, a winding 107 and a rectifier 108.

The rectifiers are conductive in the directions indicated by arrows in the conventional symbolic illustration of such rectifiers.

Associated with the inductor windings 101, 103, 105 and 107, are respectively, the aforesaid flux biasing direct current windings 86, 87, 88 and 89 shown without connections, but shown connected in the line 85 between mains E and F as already described, and energized at a constant value with unidirectional current.

The aforesaid control winding 60 of the balancing loop D, is shown at the transductor I, and is associated with all of the other windings, and to render this apparent in the diagrammatic showing, it is illustrated as in four parts 60—60—60—60.

Cores are shown diagrammatically at 109—110—111—112 one for each set of windings, for example a core 109 for the windings 60, 86 and 101.

Figure 4:
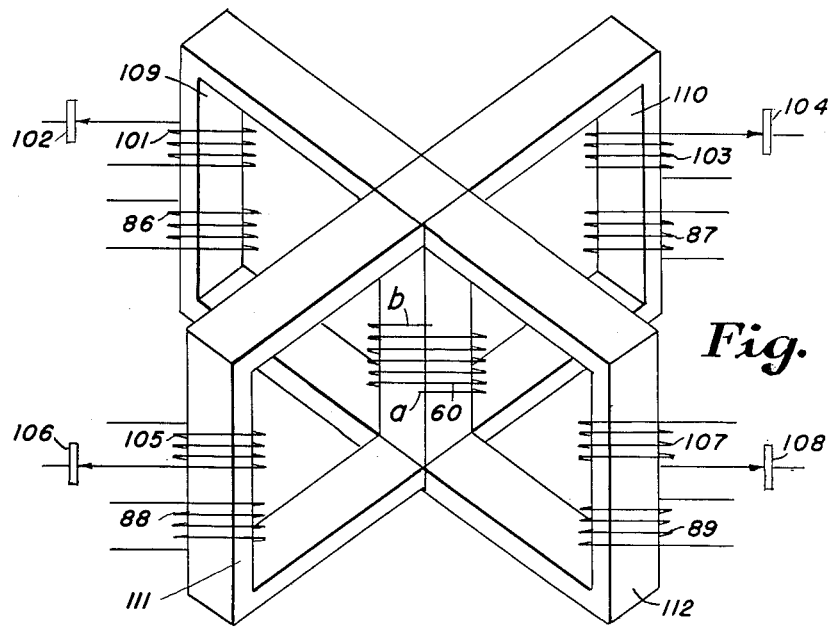
Fig. 4 is a perspective view of cores and windings of the diagrammatic transductor of Fig. 3.

A perspective view, of a mechanical arrangement for the windings and cores is shown in Fig. 4. Here the cores 109—110—111—112 on which the inductor windings and flux biasing windings are wound, are complete rectangular cores. The arrangement corresponds in all respects to the diagrammatic showing of Fig. 3, except that the control winding 60 is shown wound around a leg of each core and is therefore common to all of the cores.

The flux biasing windings 86—87—88—89 are poled to be in opposition to their respectively associated inductor windings 101, 103, 105, 107; and thus bias the flux in the inductor windings to reduce their normal inductance and cause an intermediate value of current to flow therein.

When current flows in the winding 60 it is unidirectional; and it will be observed, with reference to Fig. 4, that if the flux produced by it, flows say upwardly, it will oppose the flux in inductor winding 103 and augment the flux in inductor winding 105; and oppose the flux in winding 101 and augment that in winding 107; and conversely if it is energized in the other direction.

Mains 113—114 in Fig. 3 are connected to the corners 97—98.

Across the mains 113—114 are two resistors 115—116 of equal value, in series, the aforesaid main H being connected to a point 117 between them.

Across the mains 113—114 are also connected in series two equal resistors 118—119 and a potentiometer resistor 120 between them, the latter having a movable contact arm 121 which may be considered as a point 121, connected by a wire 122 to the mid point of the secondary 69 and to the aforesaid main F.

The ends of the aforesaid secondary 69 of the transformer 67 are connected to the corners 100—99 of the rectangular loop, by wires 123 and 124.

As will appear, the potential impressed on the mains 113—114 is unidirectional, the transductor I among other functions, performing full wave rectification of the current supplied by the transformer secondary 69. A description for one half wave as to its impressing a voltage on the mains 113—114 will be given herein, and it will be understood that a description for the other half wave would be the same.

It will be assumed, under the conditions obtaining at this time, that the winding 60 is not energized; and that the contact arm 121 is at the middle of the resistor 120.

When current flows toward the right in secondary 69, the potential of the right half of secondary 69 is impressed on a circuit comprising the wire 123, point 100, inductor winding 103, rectifier 104, point 97, main 113, resistor 118, part of resistor 120, point 121, wire 122 to the mid point of the secondary 69; and the potential of the left half of secondary 69 is impressed on a circuit comprising, wire 122, point 121, part of resistor 120, resistor 119, wire 114, point 98, inductor winding 105, rectifier 106, point 99 and wire 124.

Half waves of alternating current thus flow from the secondary 69 through the resistor 118 and part of 120, and through the resistor 119 and part of 120, and due to the inductance of the windings 103 and 105 would (in the absence of other provisions) be very small, but because of the opposing biasing windings 87 and 88 the flux is kept from rising above a predetermined value and the inductance is kept down and the current is of a substantial value predetermined by the windings 87 and 88.

The said currents produce two equal drops of potential in the resistors 118—120 and 119—120 respectively.

The arm of point 121 is at the middle of the potential drop.

The drops of potential produce a predetermined potential between the mains 113—114.

The control main F is connected by wire 122 to the arm 121 at the middle of the drop between mains 113—114.

The aforesaid resistors 115 and 116 being also connected across the mains 113—114, and being equal, the drop between the mains divides equally between them at all times, and the middle or halfway point of the drop is at the point 117 to which the main H is connected.

It will thus be seen, that under the assumed conditions, the mains H and F will be at the same potential.

Due to inaccuracies of value of the resistors 118 and 119, and to errors of manufacture and assembly of the parts and other incidental discrepancies, when the arm 121 is at the mid position, on the resistor 120, the said two drops of potential may not be equal and the potential of the mains H and F may not be equal; but it is believed to be apparent that they may be made equal by adjusting movement of the arm 121 in one direction or the other, and this equalizing position of the arm 121 is taken as its zero setting on a dial thereof not shown.

As to the action of the control winding 60; as referred to above, and with reference to Figs. 3 and 4, current flowing in at $a$ and out at $b$ will oppose the flux in inductor winding 103 and augment that in winding 105, with the result that more current will flow through winding 103 and through resistor 118, and less current through winding 105 and resistor 119; thus increasing and decreasing respectively the potential drops in these resistors and lowering the potential at the point 121 and at the main F, without changing the potential across mains 113—114 and therefore without changing the potential of main H—H.

If current flows in the reverse direction in the winding 60, it will, conversely raise the potential of main F relative to that of main H—H.

With the grid 83 of the tube G connected to the mains H, and the mains H and F at equal potential at the zero setting of the arm 121, and the cathode of the tube G being at the potential of the point 81, the tube G passes current of a value determined by the potential of the point 81, preselected as referred to, and this current flowing in the winding 39, actuates the phase shift system to cause the rectifier B to energize the generator field at say one half full strength.

As an illustrative example, it may be a field designed for 250 volts full strength and energized at 125 volts.

To put the system as a whole into operation, the output circuit of the generator A may be opened, say at a contactor 125.

A voltmeter, 126 is connected across the output mains 5—6. The potentiometer arm 121 of Fig. 3 is set at its zero position, putting the mains H and F at equal potential.

This energizes the field 2, at, in general, 125 volts, as described.

The propelling motor 46 is started and the strip brought up to known speed.

The generator C is driven by the strip and its output flows through the resistance unit 55. The main rheostat 56 controlling the output of the generator C is set at a value corresponding generally to the job in hand and the micrometer rheostat 57 is adjusted until a voltmeter at 127 indicates, in the illustrative case, a voltage drop of say .1 volt.

The generator line contactor 125 is closed and its load current flows through the resistance unit 51 producing voltage drop therein, opposing that in the unit 55.

For the known speed of the strip there is a corresponding predetermined value for the current of generator A at the desired predetermined ratio, and the current will be indicated on the ammeter A.

To adjust the current to this value, if adjustment is needed, the arm 121 may be rotated on the resistor 120 in one direction or the other. This will change relatively the said two drops of potential (between mains 113 and 114 as described) and cause the potential of main F to become higher or lower with respect to that of main H, which, as is believed will now be apparent, will change the current passed by tube G and flowing in winding 39 and responsive to the latter the rectifier B will change the energization of field 2 and thereby change the generator output current.

When the predetermined ratio is thus established between the main current and the strip speed, then, as the preferred mode of operation, the current of generator C can be adjusted at 56—57 until its voltage drop in resistor 55 equals that in 51 and no current flows in the winding 60, so long as the predetermined ratio obtains.

Thereafter upon a deviation of the ratio, one drop will preponderate and current will flow in the winding 60 and cause it to influence the transductor I as described to vary the potential between mains H and F and thereby change the main generator current to restore the ratio, whether the deviation was due to change of generator current or due to change of strip speed.

As another mode of operation, the apparatus may be adjusted so that, at the predetermined ratio, the drops in the loop resistors 51 and 55 will be unequal and current will be always flowing in the control winding 60, in one direction or the other. Then upon deviation from the ratio, the current in the winding 60 will increase or decrease from said value and restore the ratio.

For a given strip speed there is a predetermined main generator current at said ratio. To make the drops in the loop resistors unequal, that in resistor 55 may be changed at the rheostats 56—57. Current then flowing in winding 60 will influence the transductor I to give a difference of potential between mains H—H and F, which would tend to change the generator current from its predetermined ratio value. But this would be compensated for by a different setting of the rheostat arm 121; or by a different potential value at the point 81 effected by a choice of different values for the resistors 78—79; or by both means.

After the predetermined ratio is once established at a given strip speed and corresponding generator current, the system operates automatically to maintain the ratio. By the mode of operation in which no current flows in winding 60, any increase of strip speed will increase the output of generator C and momentarily cause current to flow in the winding 60, and thereby, as described, cause an increase of generator current to again restore ratio and restore balance in the loop D.

Similarly, a decrease of strip speed will reduce the current of generator A in the opposite manner to restore the ratio.

A momentary increase or decrease of current of generator A will similarly cause current to flow in winding 60 with the effect of reducing or increasing the generator current to restore the ratio.

In the mode of operation in which current is always flowing in the loop circuit and winding 60, the ratio is similarly maintained when deviation therefrom causes the current in the winding to increase or decrease.

If the strip should break, the drop of potential in unit 51 of the loop D due to generator current, would energize the winding 60 so strongly, in the direction to effect reduction of current passed by the tube G, as to shut down the rectifier B and de-energize the field 2 and cut off the generator current.

Figure 5:
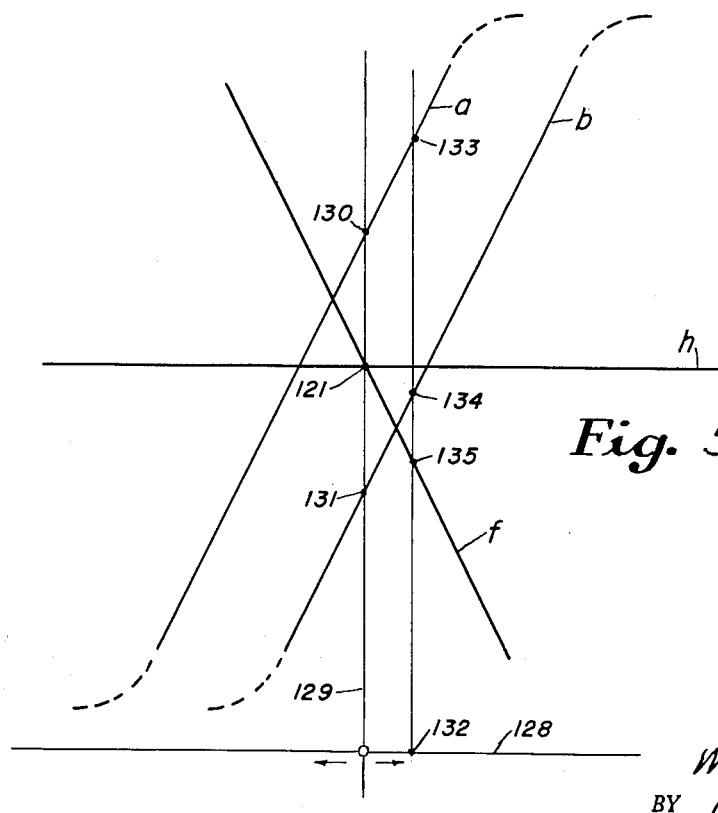
Fig. 5 is a diagram illustrating variations of potential of the control mains of Fig. 3 occurring responsive to variations of current in the control winding of Figs. 1 and 3.

The sensitivity of response of the transductor I to current in the winding 60 of loop D, in causing a change of potential between the mains H and F, for the purposes described is illustrated in the graphs of Fig. 5.

Current values in the winding 60 in one direction or the other from zero, are considered along line 128 at one side or the other from a vertical coordinate line 129 going through zero current value.

Potentials are considered vertically, positive up, and negative down.

A base line $h$ and a diagonal line $f$ represent respectively, and relatively, the said potentials on the mains H and F for different values of current; potential on the main H, line $h$, being constant as described for Fig. 3, and potentials on the main F line $f$ being derived in Fig. 5 as follows.

In Fig. 3, when the current is at zero value in the winding 60, the output potential of the transductor I between mains 113 and 114 drops equally through resistors 118 and 119, as described, and the point 121 in Fig. 3 is at the same potential as the main H. In Fig. 5, point 121 on the zero current coordinate line 129 and in the line $h$ correspondingly represents the potential both on main H, line $h$, and main F, line $f$, at zero current.

Points 130—131 in Fig. 5 are taken on the coordinate line 129 so that the distance between them represents the output potential on mains 113—114; and they are taken equidistant from point 121; and the distances from the points 130—131 to the point 121, therefore represent the drops of potential in resistors 118 and 119 respectively.

When the current in winding 60 rises from zero, say toward the right in Fig. 5, the drop of potential in resistor 118 increases and that in resistor 119 decreases, as described, and for some value of current for example that represented at 132, the point 130 moves to a higher value, 133, representing the increased potential drop, and the point 131 moves to a lesser value 134, representing the decreased drop, the distance between 133—134 remaining the same as between 130—131 as representing the constant total output potential of the transductor.

The potential at point 121 as representing the potential of main F therefore moves to a lesser value, to point 135, found by taking the difference between the values at points 133 and 130 or between the values at points 131 and 134. The line $f$ thus determined by points 121 and 135 represents the potential on main F.

The lines $a$ and $b$ thus determined by points 130—131 and points 131 and 134 respectively (and by other points found in a similar manner), are rectilinear, within the range of current values for regulating purposes; and accordingly, the line $f$ will be rectilinear, by plane geometry.

Obviously, the lines $a$, $b$ and $f$ when thus developed will include values for a range of current on both sides of zero; whereby the relative potentials of the mains F and H of Fig. 3 will be represented by the lines $f$ and $h$ of Fig. 5, whether the potential of main F is lower or higher than that of main H.

The sensitivity of response to the winding 60, to vary the potential between mains H and F of Fig. 3 for variations of current in winding 60, is shown by the angular divergence of lines $h$ and $f$ in Fig. 5; a great difference of potential responding to a small change of current; and uniformity of sensitivity over a wide range of current values results from the rectilinear characteristics of the lines $h$ and $f$.

It is believed to be apparent from the foregoing that lines $h$ and $f$ in Fig. 5 represent the potentials on the mains H and F of Fig. 3 for either of said modes of operation.

The above described sensitivity of response to the winding 60 is represented qualitatively by Fig. 5. The sensitivity quantitatively is not so readily apparent in the diagram, and is here further explained.

The transductor I, is an amplifier; and because of its construction and arrangement of parts and circuits delivers output potential that is an amplification of the control potential, on the winding 60, of the order of several-thousand-to-one.

For example, in the mode of operation in which no current flows in winding 60, at the predetermined ratio, and there is then no potential difference between the mains H and F, a deviation from the ratio that causes as little as 1 millivolt of potential on the winding 60, will, by amplification, cause the transductor output potential to be so greatly amplified that a difference of 2 or three volts between the mains H and F will result.

The novelty of the transductor I that provides the aforesaid rectilinear sensitivity resides in the provision of four transductor elements each comprising a core, an A. C. inductor winding, a rectifier, and a D. C. flux biasing winding; the transductor elements arranged to provide two full-wave transductors; energized by one transformer secondary and having two output mains; and the level of flux in all of the cores being subject to the current in a single D. C. saturating winding; and a voltage divider across the output mains having an adjustable point, connected to the mid point of the secondary.

Referring again to Fig. 3, there is shown generally at J a novel filtering circuit, part of which is connected in each of the mains H—F and part of it across these mains for the following purposes.

The current in the mains H—F is, as described, derived, by rectification in the transductor I, from alternating current of the secondary 69, which will ordinarily be at the commercial frequency of 60 cycles per second; and the unidirectional current will accordingly have ripples in it as is well known. Better regulation at the tube G will be obtained if these ripples are ironed out by a filter and this is probably well known.

Filtering circuits have been devised comprising resistors and capacitors and connections therefor which are theoretically applicable to the mains H—F for this purpose. But there are operative features of all such prior filtering circuits which would detract from the sensitivity of regulation by the tube G in the foregoing system for the following reasons, and are therefore objectionable.

A part of the sensitivity of regulation of the system as described resides in its inherent potentiality of regulating with a change of potential across the mains H—F as little as .75 volt or less. This potentiality will not be realized unless the filter employed reduces said ripples to very small values; and unless the percentage of the input to the filter that is absorbed in the filter itself is very small; and unless the time constant, or delay introduced by the filter upon a change of potential is very small.

These factors are too large in prior filters; and have been greatly reduced by the filter J which will now be described.

In the line of main H are indicated two points at 138—139 and in line F two points at 140—141.

Between the points 138—139 are a resistor 142 and a capacitor 143 in parallel.

Across the points 140—141 are a resistor 144 and a capacitor 145 in parallel.

The point 138 is connected to the point 141 by a diagonal wire 146 in the line of which are a resistor 147 and a capacitor 148 in series.

The point 139 is connected to the point 140 by a diagonal wire 149 in the line of which are a resistor 150 and a capacitor 151.

By this arrangement and with suitable values for the capacitors and resistors to be referred to, the ripples are reduced to 3% or less; the output of the filter is as high as 97% of the input or higher; and the time constant is as low as .02 second or less; which quantities are believed to be less than those of any prior filters applicable to the system.

It is known that when regulating the output of a generator by its field, the generator output may tend to "hunt," that is, to rise beyond and then fall below the value dictated by the regulation; and anti-hunting means has been proposed for various kinds of generator regulating systems.

The above described system which regulates to a constant value, the ratio between generator current and strip speed, may in some cases tend to "hunt" and in order to realize the high sensitivity and accuracy of regulation of which the system is capable the following anti-hunt provision has been made.

In Fig. 1, a transformer primary 152 is connected across the mains 3—4 of the generator A, and has a secondary 153 (shown without circuit connections). The secondary 153 is reproduced in Fig. 3, connected across the resistor 155 of a potentiometer 156 in the line H.

During regulating operation of the system, a change in generator output potential, say an increase thereof, is effected, as described, by an increase in grid current in the line H, and through the potentiometer resistor 155.

The increasing generator potential momentarily increases the potential on the primary 152 and induces a transient potential in the secondary 153. The latter impressed on the resistor 155, is poled to transiently oppose the increase of current in line H.

The rise of current in the line H is braked by said opposition, transiently, that is, only so long as the rise persists. The increase of generator potential is thus braked and comes up to the increased value without overtravel, and hunting is accordingly prevented. The operation is, of course, the same upon regulation to decrease the generator current.

Although it is believed that those skilled in the art will understand how to provide suitable values for the resistors, capacitors etc. of the drawing, the following are given as suitable for the aforesaid illustrative case.

Resistor:
| | |
|---|---|
| 119 | 1,500 ohms. |
| 118 | 1,500 ohms. |
| 116 | 22,000 ohms. |
| 115 | 22,000 ohms. |
| 147 | 470 ohms. |
| 144 | 4,700 ohms. |
| 142 | 4,700 ohms. |
| 150 | 470 ohms. |
| 79 | 50 ohms. |
| 78 | 4,000 ohms. |
| Potentiometer resistance 120 | 2,000 ohms. |

Capacitor:
| | |
|---|---|
| 148 | 0.5 mfd.—600 v. |
| 143 | 0.5 mfd.—600 v. |
| 145 | 0.5 mfd.—600 v. |
| 151 | 0.5 mfd.—600 v. |

Subject matter illustrated and described herein but not claimed is being claimed in applications Serial Number 535,490, filed September 20, 1955, and Serial Number 541,721, filed October 20, 1955.

We claim:

1. In an electric regulating system, two electric generators, and means for maintaining a predetermined ratio between the current outputs of the two generators comprising: a control winding; means impressing opposite potentials on the winding proportional to the current outputs of the respective generators, to cause no current to flow in the control winding when the two generator currents are at said ratio, and impressing unequal potentials on the control winding upon a deviation from said ratio to cause control current to flow in the winding; a pair of control mains; a transductor and net work circuit energized with alternating potential and responsive to variations of current in the control winding to supply varying rectified potential to the control mains amplified with respect to the difference of said opposite potentials impressed on the control winding, and regulating means controlling the current output of one of the generators, responsive to variations of control mains potential to effect corrective increase or decrease of said generator current to restore said predetermined ratio.

2. The system of claim 1 and in which operator operable means is provided for adjusting the current output of one of the generators, to establish said predetermined ratio.

3. The system of claim 1 and in which means is provided to drive the two generators normally at respective substantially constant speeds, and operator operable adjusting means is provided for adjusting the output current of one generator independently of its speed to establish said predetermined ratio.

4. The system of claim 1, and in which said one generator has a field winding; and the regulating means comprises an electronic tube rectifier energizing the field winding with unidirectional current from A. C. supply mains, at values determined by a phase shift network for the rectifier; and the phase shift network is responsive to the current through an electronic control tube having a control grid; and the grid is connected to be variably energized by the potential of the control mains.

5. A generator output regulating system comprising a closed loop circuit containing a winding; means impressing two opposite potentials on the loop, one always predominating over the other, and one being proportional to the generator output and the two potentials being normally at a predetermined ratio, whereby current flows at all times in the winding due to the predominating potential and will increase or decrease if the generator output changes, regulating means for the generator output actuable by changes of current in the winding, and responsive to increase or decrease the generator output, to restore the predetermined ratio between said two potentials, upon momentary deviation therefrom by a change of either potential.

6. The system of claim 1, and in which said one generator has a field winding, and the means controlling its current output comprises means energizing the field winding variably responsive to variations of potential of the control mains.

7. In an electric control system, for regulating the amperage of current in a main circuit; a control winding; means subjecting the control winding to two opposing potentials, one of which is proportional to the amperage of the main circuit, to cause no current to flow in the winding when the opposing potentials are equal and to flow in one direction or the other when they are unequal; a pair of control mains; potential supplying means automatically operative to impress constant potential on one control main and to impress potential on the other control main at values equal to, or above or below that of the one main, in response, respectively, to zero current or current in one direction or the other in the control winding; means supplying current to the main circuit and automatically operative to maintain the amperage constant or to increase it or decrease it responsive respectively to equal potentials or differences of potential in one sense or the other of the control mains.

8. The control system of claim 7 and in which the automatically operative means impressing potentials on the control mains comprises a transductor energized by alternating current input at substantially constant potential, and having a pair of unidirectional output mains at constant potential, and a pair of voltage dividers across the output mains; and the control mains are connected to mid points of the voltage dividers respectively; and the transductor is responsive to current in the control winding to vary relatively the voltage drop in the two parts of one of the voltage dividers between the mid point thereof and the respective output mains.

9. In an electric regulating system, two electric generators, and means for maintaining a predetermined ratio between the current outputs of the two generators comprising: a control winding; means impressing opposite potentials on the winding proportional to the current outputs of the respective generators and one potential predominating over the other and causing current of a predetermined value to flow in the control winding when the two generator currents are at said ratio; a pair of control mains; a transductor and net work circuit energized with alternating potential and responsive to deviations from said predetermined value of current in the control winding to supply varying rectified potential to the control mains, amplified with respect to the difference of said opposite potentials impressed on the control winding, and regulating means controlling the current output of one of the generators, responsive to variations of control mains potential to effect corrective increase or decrease of said generator current to restore said predetermined ratio.

References Cited in the file of this patent

UNITED STATES PATENTS

| | | |
|---|---|---|
| 2,251,973 | Beale et al. | Aug. 12, 1941 |
| 2,297,578 | Noddings | Sept. 29, 1942 |
| 2,403,891 | Lamm | July 9, 1946 |
| 2,455,997 | Holman | Dec. 14, 1948 |
| 2,535,978 | Winterhalter et al. | Dec. 26, 1950 |
| 2,650,342 | Kerz | Aug. 25, 1953 |

FOREIGN PATENTS

| | | |
|---|---|---|
| 803,595 | France | July 15, 1936 |